(12) United States Patent
Ishikawa et al.

(10) Patent No.: US 10,104,719 B2
(45) Date of Patent: Oct. 16, 2018

(54) RADIANT HEATER DEVICE

(71) Applicant: DENSO CORPORATION, Kariya, Aichi-pref. (JP)

(72) Inventors: Kimitake Ishikawa, Kariya (JP); Hideaki Kako, Kariya (JP); Yasuhiro Sagou, Kariya (JP); Hiroyasu Oide, Kariya (JP); Hideki Seki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/318,391

(22) PCT Filed: Jun. 29, 2015

(86) PCT No.: PCT/JP2015/003250
§ 371 (c)(1),
(2) Date: Dec. 13, 2016

(87) PCT Pub. No.: WO2016/017067
PCT Pub. Date: Feb. 4, 2016

(65) Prior Publication Data
US 2017/0118801 A1 Apr. 27, 2017

(30) Foreign Application Priority Data
Jul. 29, 2014 (JP) .................. 2014-154020

(51) Int. Cl.
*H05B 3/20* (2006.01)
*H05B 3/26* (2006.01)
(Continued)

(52) U.S. Cl.
CPC ............ *H05B 3/20* (2013.01); *B60H 1/2215* (2013.01); *F24D 13/02* (2013.01); *H05B 3/26* (2013.01);
(Continued)

(58) Field of Classification Search
CPC ........ B60H 1/2215–1/2225; H05B 3/20–3/38; H05B 3/86
(Continued)

(56) References Cited

U.S. PATENT DOCUMENTS

| 4,207,456 A | 6/1980 | Best |
| 4,250,398 A * | 2/1981 | Ellis .................. B32B 7/02 219/549 |

(Continued)

FOREIGN PATENT DOCUMENTS

| JP | S64010033 A | 1/1989 |
| JP | 3137885 U | 12/2007 |

(Continued)

OTHER PUBLICATIONS

English translation of WO 2012/004971 to Ogino, Hiroyuki, published Dec. 1, 2012.*

*Primary Examiner* — Michael Laflame, Jr.
(74) *Attorney, Agent, or Firm* — Harness, Dickey & Pierce, P.L.C.

(57) ABSTRACT

A radiant heater device radiates a radiation heat when a current is applied to a heat generating part having a flat shape. The radiant heater device has a cover and a supporting member. The cover is arranged in a direction in which the radiation heat is radiated and covers the heat generating part. The supporting member supports the cover. The cover is made of a material having a greater infrared transmissivity relative to the supporting member.

7 Claims, 3 Drawing Sheets

(51) Int. Cl.
  *H05B 3/86* (2006.01)
  *F24D 13/02* (2006.01)
  *B60H 1/22* (2006.01)

(52) U.S. Cl.
  CPC .......... *H05B 3/86* (2013.01); *F24D 2200/08* (2013.01); *H05B 2203/032* (2013.01)

(58) Field of Classification Search
  USPC .................. 219/200–204, 213; 392/435–439
  See application file for complete search history.

(56) References Cited

U.S. PATENT DOCUMENTS

| | | | | |
|---|---|---|---|---|
| 6,486,051 B1* | 11/2002 | Sabin | ................ | H01L 23/5228 257/E23.02 |
| 6,824,639 B1* | 11/2004 | Hill | ................ | B44C 1/1716 156/230 |
| 6,890,810 B2* | 5/2005 | Amadon | ................ | H01C 7/006 257/379 |
| 2005/0057789 A1* | 3/2005 | Funada | ................ | B29C 59/022 359/31 |
| 2008/0286526 A1* | 11/2008 | Konakahara | ......... | G01N 21/658 428/137 |
| 2009/0044464 A1* | 2/2009 | Schmidt | ............ | B32B 17/10036 52/171.2 |
| 2009/0114928 A1* | 5/2009 | Messere | ................ | B32B 17/10 257/88 |
| 2011/0217455 A1* | 9/2011 | Veerasamy | ............ | B82Y 10/00 427/122 |
| 2012/0103961 A1* | 5/2012 | Offermann | ............... | H05B 3/84 219/203 |
| 2012/0267354 A1 | 10/2012 | Okamoto et al. | | |
| 2012/0315414 A1* | 12/2012 | Wesch | ................ | B60G 7/001 428/34.1 |
| 2013/0014808 A1* | 1/2013 | Brounne | ............ | H01L 31/0481 136/251 |
| 2017/0251526 A1* | 8/2017 | Schall | ..................... | H05B 3/86 |

FOREIGN PATENT DOCUMENTS

JP    2012228896 A    11/2012
WO    WO-2012004971 A1    1/2012

* cited by examiner

РАДИАНТ HEATER DEVICE

CROSS REFERENCE TO RELATED APPLICATIONS

This application is a U.S. National Phase Application under 35 U.S.C. 371 of International Application No. PCT/JP2015/003250 filed on Jun. 29, 2015 and published in Japanese as WO 2016/017067 A1 on Feb. 4, 2016. This application is based on and claims the benefit of priority from Japanese Patent Application No. 2014-154020 filed on Jul. 29, 2014. The entire disclosures of all of the above applications are incorporated herein by reference.

TECHNICAL FIELD

The present disclosure relates to a radiant heater device.

BACKGROUND ART

Conventionally, a heater device is known (e.g., refer to Patent Literature 1). The heater device has a heat generating part and a guard part that is arranged in front of the heat generating part and provided with an opening through which a radiation heat generated by the heat generating part passes, thereby a contact with the heat generating part is avoided.

PRIOR ART LITERATURES

Patent Literature

Patent Literature 1: WO 2012-004971 A1

SUMMARY OF INVENTION

According to studies conducted by the inventors of the present disclosure, an amount of heat radiated to an outside is reduced due to the guard part in the device described in Patent Literature 1, because a radiation of radiation heat from the heat generating part is blocked due to the guard part that avoids a contact with the heat generating part. For example, a radiation heat passing through the guard part is dramatically reduced, and thereby a passenger may feel much less warming, when the opening of the guard part is set to be 5 millimeters such that, for example, a finger of a child is prevented from being in contact with the heat generating part.

The present disclosure addresses the above issues, and it is an objective of the present disclosure to prevent a decrease of a radiation heat and to prevent an object from being in contact with a heat generating part.

A radiant heater device radiates a radiation heat when a current is applied to a heat generating part having a flat shape. The radiant heater device has a cover and a supporting member. The cover is arranged in a direction in which the radiation heat is radiated and covers the heat generating part. The supporting member supports the cover. The cover is made of a material having a greater infrared transmissivity relative to the supporting member.

According to the above-described configuration, a decrease of the radiation heat can be suppressed, and an object can be prevented from being in contact with the heat generating part, since the cover covering the heat generating part is configured by a material having a greater infrared transmissivity relative to the supporting member that supports the cover.

DESCRIPTION OF EMBODIMENTS

Embodiments of the present disclosure will be described hereafter referring to drawings. In the embodiments, a part that corresponds to or equivalents to a matter described in a preceding embodiment may be assigned with the same reference number.

First Embodiment

Figure 1:
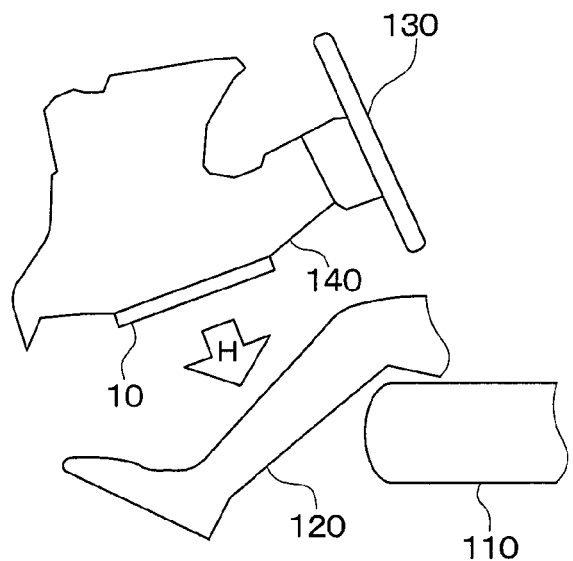
FIG. 1 is a side view illustrating a heater device according to a first embodiment.

A first embodiment will be described hereafter referring to FIG. 1 through FIG. 3. As shown in FIG. 1, a heater device 10 according to the first embodiment is disposed, for example, in a cabin of a vehicle traveling along a road. The heater device 10 configures a part of a heater for heating the cabin. The heater device 10 is an electric heater that generates heat when a current is applied thereto from a power source such as a cell or a power generator mounted in a vehicle. The heater device 10 has a thin plate shape. The heater device 10 radiates a radiation heat H mainly in a direction perpendicular to a surface of the heater device 10 to heat the target located to face the heater device 10 in the direction perpendicular to the surface.

A seat 110 on which a passenger 120 seats is disposed in the cabin. The heater device 10 is arranged in the cabin to radiate the radiation heat H toward foot of the passenger 120. The heater device 10 can be used as a device that promptly provides a feeling of warming to the passenger 120 right after starting another heater. The heater device 10 is arranged to face the passenger 120 seating in an assumed normal posture. For example, the vehicle has a steering column 140 that supports a steering wheel 130. The heater device 10 may be arranged to face the passenger 120 on a lower side of the steering column 140.

Figure 2:
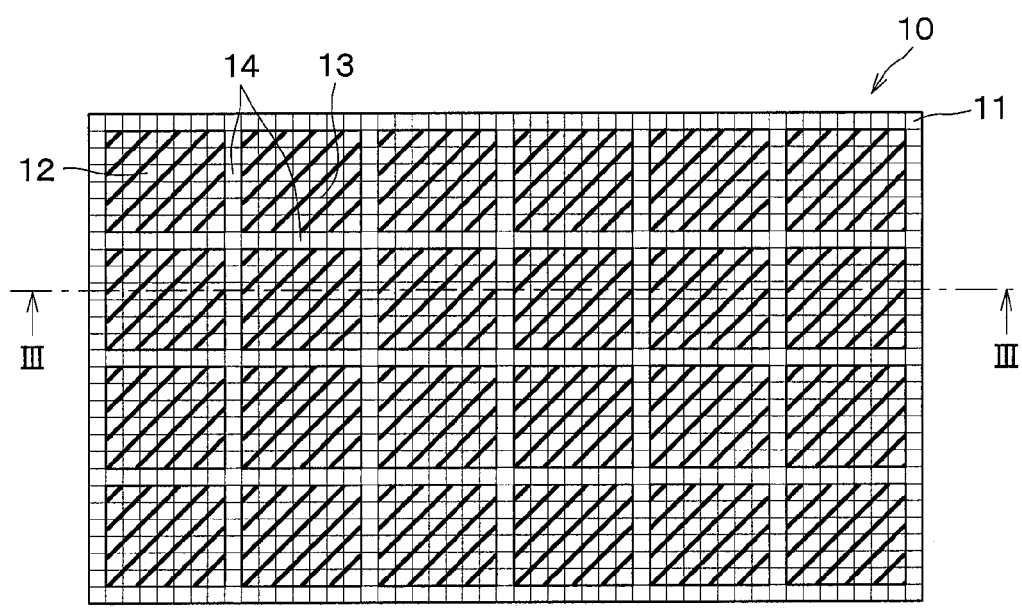
FIG. 2 is a front view illustrating the heater device according to the first embodiment.
Figure 3:
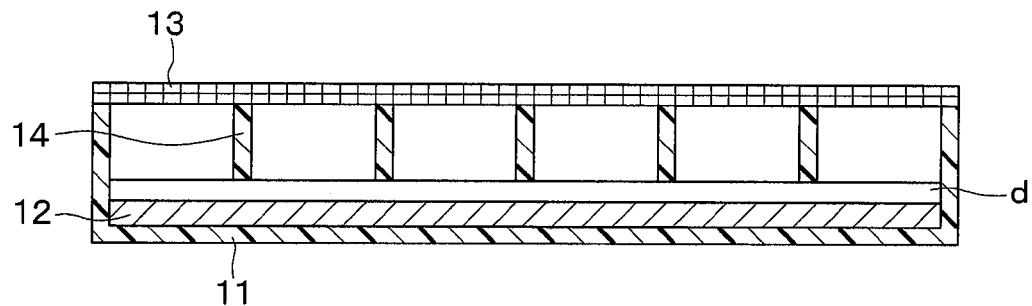
FIG. 3 is a cross-sectional view taken along a line III-III shown in FIG. 2.

FIG. 2 is a front view illustrating the heater device 10 of the first embodiment. FIG. 3 is a cross-sectional view taken along a line III-III shown in FIG. 2.

The heater device 10 has a case 11, a heat generating part 12, an infrared transmission net 13, and a net supporting member 14. The heat generating part 12 in FIG. 2 is shown with a slash hatching although it is not a sectional view. The heater device 10 is configured as a radiant heater device that radiates a radiation heat when a current is applied to the heat generating part 12 that has a flat shape and generates infrared rays.

The case 11 and the net supporting member 14 are made of a resin material such as ABS, polypropylene (i.e., PP), and nylon.

The heat generating part 12 generates heat when a current is applied thereto and generates the radiation heat H shown in FIG. 1. The heat generating part 12 is made of a material such as an alloy (e.g., Cu—Sn) of copper and stannum, a metal such as silver, stannum, stainless steel, nickel, or Nichrome, and an allow including the metals. The heat generating part 12 is housed in the case 11.

The infrared transmission net 13 is a cover covering the heat generating part 12 and is arranged in a direction in which the radiation heat is radiated. The infrared transmission net 13 is provided to prevent an object from being in contact with the heat generating part 12. The infrared transmission net 13 is made of a material through which an infrared ray having a wave of 4 micrometer ($\mu$m), which is easily absorbed into a human body, transmits easily. Specifically, the infrared transmission net 13 is made of a fibrous polyethylene to have a net shape. The infrared rays can transmit the infrared transmission net 13 more easily by forming the infrared transmission net 13 to have the net shape having voids with a fibrous polyethylene.

The net supporting member 14 has a structure configured by thin plates to have a lattice shape. The net supporting member 14 is a supporting member that supports the infrared transmission net 13 and has a greater stiffness relative to the infrared transmission net 13.

The net supporting member 14 is arranged between the heat generating part and the infrared transmission net 13. The net supporting member 14 is connected to an inner side wall of the case 11. A void having a specified dimension is provided between the net supporting member 14 and the heat generating part 12. The dimension of the void d between the net supporting member 14 and the heat generating part 12 is set to be a length that can prevent the net supporting member 14 and the heat generating part 12 from being in contact with each other even in a case that the infrared transmission net 13 and the net supporting member 14 are deformed when an object comes in contact therewith. Thus, the infrared transmission net 13 can be prevented from having a high temperature due to a heat transfer from the heat generating part 12 in a manner that the void d having a specified dimension is provided between the net supporting member 14 and the heat generating part 12.

The infrared transmission net 13 is made of a material having a greater infrared transmissivity relative to the net supporting member 14. The infrared transmissivity of the infrared transmission net 13 is greater than or equal to 70%. In contrast, an infrared transmissivity of the net supporting member 14 is lower than the infrared transmissivity of the infrared transmission net 13 (e.g., lower than or equal to 20%).

An assembly of the heater device 10 will be described hereafter. The case 11 is prepared first. Subsequently, the heat generating part 12 is inserted from the opening of the case 11, and the heat generating part 12 is housed in a bottom portion of the case 11. Then, the net supporting member 14 is mounted on an upper side of the heat generating part 12.

A sidewall of the case 11 is provided with a protruding portion (not shown) that provides a void between the net supporting member 14 and the heat generating part 12, and thereby the net supporting member 14 and the heat generating part 12 are prevented from being in contact with each other. In addition, an upper surface of the sidewall of the case 11 is located in the same level as an upper end of the net supporting member 14 when the net supporting member 14 is inserted to the case 11.

The assembly of the heater device 10 is completed by fastening the infrared transmission net 13 to the upper surface of the sidewall of the case 11 after arranging the infrared transmission net 13 to cover the net supporting member 14 and the case 11.

An operation of the heater device 10 of the present embodiment will be described hereafter.

The heat generating part 12 starts generating heat when a current is applied to the heat generating part 12, and a temperature of the heat generating part 12 increases, and thereby the radiation heat H is generated. In addition, the heat generating part 12 radiates infrared rays.

Here, infrared rays radiated from the heat generating part 12 are interrupted significantly in a case that the cover covering the heat generating part 12 is made of a resin material that hardly passes the infrared rays.

In contrast, according to the heater device 10, the cover covering the heat generating part 12 is configured by the infrared transmission net 13, and the infrared transmission net 13 is supported by the net supporting member 14 that has a greater stiffness relative to the infrared transmission net 13. Moreover, the infrared rays radiated from the heat generating part 12 pass through the infrared transmission net 13, and the radiation heat H is supplied to the passenger 120 sufficiently, since the infrared transmission net 13 is made of a material having a greater infrared transmissivity relative to the net supporting member 14. Furthermore, the infrared transmission net 13 prevents the passenger 120 from being in contact with the heat generating part 12.

According to the above-described configuration, the radiant heater device radiates the radiation heat when a current is applied to the heat generating part 12 having a flat shape. The radiant heater device has the infrared transmission net 13 and the net supporting member 14. The infrared transmission net 13 is arranged in a direction in which the radiation heat is radiated and covers the heat generating part 12. The net supporting member 14 supports the infrared transmission net 13. The infrared transmission net 13 is made of a material having a greater infrared transmissivity relative to the net supporting member 14. Therefore, a decrease of the radiation heat can be suppressed, and an object can be prevented from being in contact with the heat generating part.

The infrared transmission net 13 and the net supporting member 14 respectively have structures that are not directly in contact with the heat generating part 12. Specifically, the net supporting member 14 is arranged between the heat generating part 12 and the infrared transmission net 13, and a void is provided between the net supporting member 14 and the heat generating part 12. As a result, heat generated in the heat generating part 12 does not transfer directly to the net supporting member 14, and the infrared transmission net 13 can be prevented from having a high temperature. That is, the passenger 120 can be prevented from having an uncomfortable felling regarding heat even when the passenger 120 touches the infrared transmission net 13.

The infrared transmission net 13 is made of a material that has great infrared transmissivity and relatively low stiffness. Accordingly, a thickness of the infrared transmission net 13 is reduced by a pressing force from the passenger 120 when the passenger 120 touches the infrared transmission net 13, in a case that the infrared transmission net 13 is in contact with the heat generating part 12 without disposing the net supporting member 14. In other words, a distance between the heat generating part 12 and the infrared transmission net 13 becomes short. As a result, a distance between the passenger 120 and the heat generating part 12 becomes short, and thereby the passenger 120 may easily feel uncomfortable due to heat. According to the present embodiment, the infrared transmission net 13 and the heat generating part 12 are distanced from each other by disposing the net supporting member 14, and therefore the passenger 120 can feel much less uncomfortable due to heat.

In addition, the infrared transmission net 13 is made of a material having greater infrared transmissivity relative to the net supporting member 14, and thereby a raise of a temperature of the infrared transmission net 13 can be suppressed.

Dimensions between adjacent two of the thin plates configuring the net supporting member 14 may be different from each other depending on stiffness of the infrared transmission net 13, such that an infrared transmissivity can be secured, and a strength of the infrared transmission net 13 can be secured when the passenger 120 touches the infrared transmission net 13. Specifically, the dimensions between adjacent two of the thin plates configuring the net supporting member 14 may be increased as the stiffness of the infrared transmission net 13 is increased, or the dimensions between adjacent two of the thin plates configuring the net supporting member 14 may be decreased as the stiffness of the infrared transmission net 13 is decreased.

For example, an amount of infrared rays passing through the infrared transmission net 13 may be reduced when increasing the stiffness of the infrared transmission net 13, however the infrared transmissivity can be secured, and the strength of the infrared transmission net 13 can be secured when the passenger 120 touches the infrared transmission net 13, since the dimensions between adjacent two of the thin plates configuring the net supporting member 14 can be increased.

The dimensions between adjacent two of the thin plates configuring the net supporting member 14 is required to be smaller when decreasing the stiffness of the infrared transmission net 13, however the infrared transmissivity can be secured, and the strength of the infrared transmission net 13 can be secured when the passenger 120 touches the infrared transmission net 13, since the amount of infrared rays passing through the infrared transmission net 13 is increased.

Second Embodiment

Figure 4:
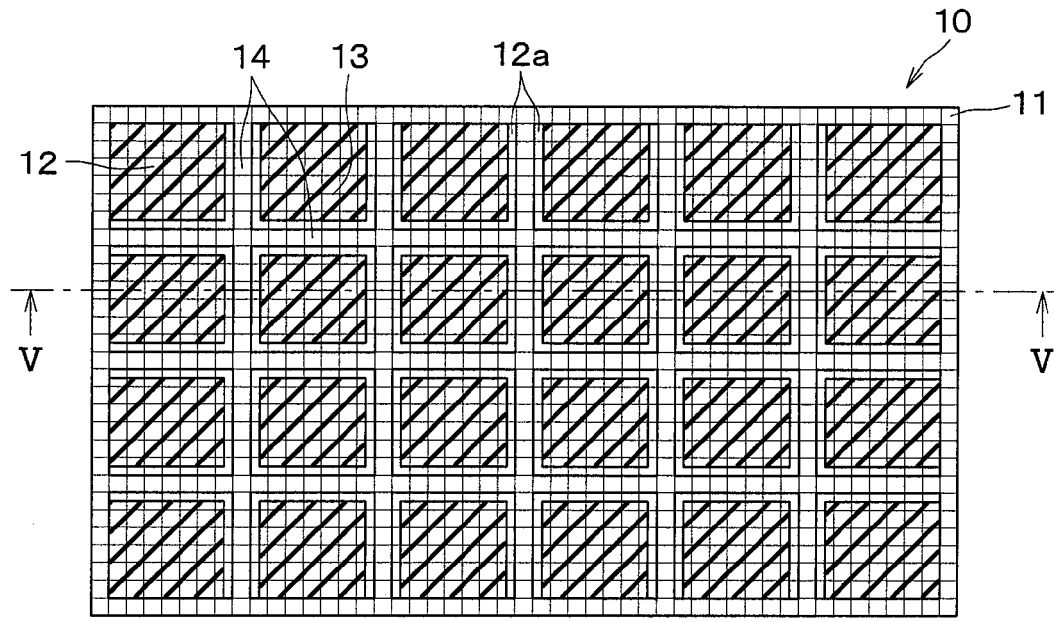
FIG. 4 is a front view illustrating a heater device according to a second embodiment.
Figure 5:
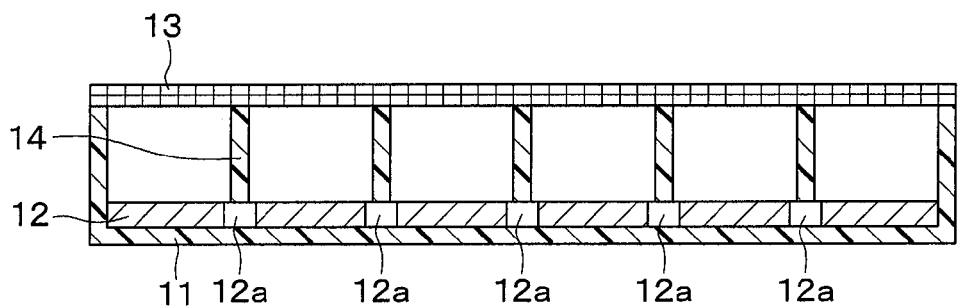
FIG. 5 is a cross-sectional view taken along a line V-V shown in FIG. 4.

FIG. 4 is a front view illustrating a heater device according to a second embodiment. FIG. 5 is a cross-sectional view taken along a line V-V shown in FIG. 4. In the heater device according to the first embodiment, the void d having a specified dimension is provided between the net supporting member 14 and the heat generating part 12, such that heat generated in the heat generating part 12 is prevented from transferring directly to the net supporting member 14. In contrast, in the heater device according to the present embodiment, absence portions 12a, which lack a heat generation function, are provided in the heat generating part 12 at locations in which the heat generating part 12 and the net supporting member 14 are in contact with each other. The net supporting member 14 is arranged on the absence portions 12a, such that heat generated in the heat generating part 12 is prevented from transferring directly to the net supporting member 14.

That is, the heat generating part 12 of the heater device 10 is provided with the absence portions 12a, which lack the heat generation function, at locations in which the heat generating part 12 and the net supporting member 14 are in contact with each other. A width of the absence portions 12a is larger than a width of the thin plates configuring the net supporting member 14. Although a slash hatching is applied to the heat generating part 12 in FIG. 2 in the first embodiment, a slash hatching is not applied to the absence portions 12a of the heat generating part 12 in FIG. 4.

The net supporting member 14 is arranged between the absence portions 12a and the infrared transmission net 13. That is, the thin plates configuring the net supporting member 14 respectively abut upon the absence portions 12a provided in the heat generating part 12, such that heat from the heat generating part 12 does not transfer directly to the net supporting part 14 when the heat generating part 12 generates heat.

According to the above-described configuration, the heat generating part 12 has the absence portions 12a, and the net supporting member 14 is arranged between the infrared transmission net 13 and the absence portions 12a. In other words, the absence portions 12a are located on an opposite side of the infrared transmission net 13 with respect to the net supporting member 14. The heat generating part 12 and the net supporting member 14 are not directly in contact with each other since the net supporting member 14 is located between the absence portions 12a and the infrared transmission net 13. As a result, heat generated in the heat generating part 12 does not transfer directly to the net supporting member 14, and thereby the infrared transmission net 13 can be prevented from having a high temperature.

Although the thin plates configuring the net supporting member 14 respectively abut upon the absence portions 12a provided in the heat generating part 12 according to the present embodiment, a void may be provided between the absence portion 12a and the net supporting member 14.

Third Embodiment

Figure 6:
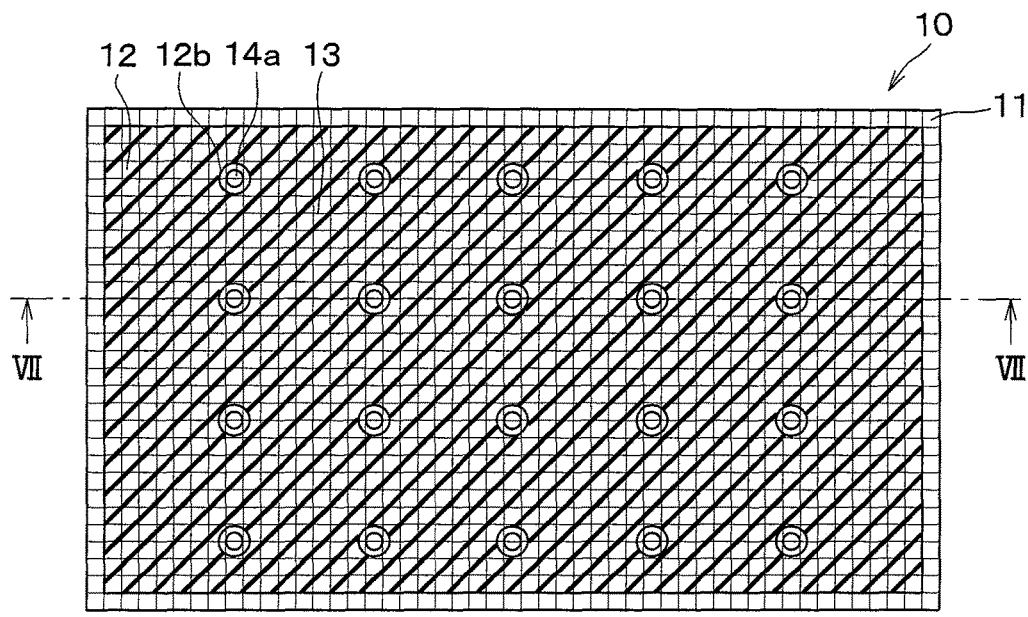
FIG. 6 is a front view illustrating a heater device according to a third embodiment.
Figure 7:
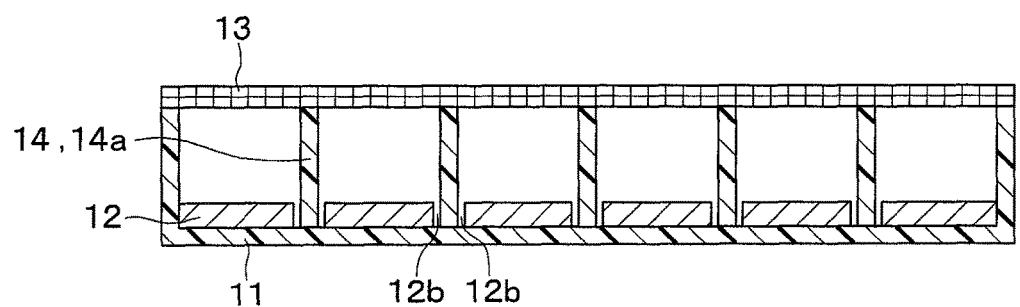
FIG. 7 is a cross-sectional view taken along a line VII-VII shown in FIG. 6.

FIG. 6 is a front view illustrating a heater device according to a third embodiment. FIG. 7 is a cross-sectional view taken along a line VII-VII shown in FIG. 6. The net supporting member 14 according to the above-described first and second embodiments is configured by thin plates integrated with each other to have the lattice shape. The net supporting member 14 according to the present embodiment has a structure configured by column portions 14a made of resin and arranged to have a lattice shape. The column portions 14a arranged to have a lattice shape are fastened to the case 11 by screwing.

The heat generating part 12 of the heater device according to the present embodiment has holes 12b to avoid being in contact with the net supporting member 14. In other words, the heat generating part 12 has the holes 12b that are formed such that the heat generating part 12 and the net supporting member 14 are distanced from each other. The holes 12b provided in the heat generating part 12 are arranged at locations corresponding to the column portions 14a configuring the net supporting member 14. The net supporting member 14 is arranged between the infrared transmission net 13 and the case 11 to pass through an inside of the holes 12b. That is, the column portions 14a configuring the net supporting member 14 respectively pass through the holes 12b provided in the heat generating part 12 and abut upon a bottom portion of the case 11, such that the column portions 14a configuring the net supporting member 14 and the heat generating part 12 are not directly in contact with each other.

According to the above-described configuration, the heating device 10 has the case 11 housing the heat generating part 12, the heat generating part 12 has holes 12b to avoid being in contact with the net supporting member 14, and the net supporting member 14 is arranged between the infrared transmission net 13 and the case 11 to pass through the inside of the holes 12b. As a result, heat generated in the heat generating part 12 does not transfer directly to the net supporting member 14, and thereby the infrared transmission net 13 can be prevented from having a high temperature.

Moreover, the net supporting member 14 is configured by the column portions 14a arranged to have the lattice shape, and thereby infrared rays radiated from the heat generating part 12 can be more effectively prevented from being blocked as compared to the net supporting member 14 of the above-described first and second embodiment that is configured by thin plates integrated with each other.

Other Modifications

According to the above-described first to third embodiments, the cover covering the heat generating part 12 is configured by the infrared transmission net 13 that is made of material passing infrared rays. However, the cover may be configured by a cloth or a woven (i.e., a fabric) made of a material passing infrared rays.

According to the above-described embodiments, the infrared transmission net 13 is made of polyethylene having greater infrared transmissivity relative to the net supporting member 14. However, the infrared transmission net 13 may be made of another material, other than polyethylene, such as polyolefin having greater infrared transmissivity relative to the net supporting member 14.

Although the case 11 and the net supporting member 14 are made of a resin material such as ABS, polypropylene (PP), and nylon, the material is not limited to the example.

According to the above-described first embodiment, the net supporting member 14 is supported by the protruding portion (not shown) provided in the sidewall of the case 11 such that the void is provided between the net supporting member 14 and the heat generating part 12. However, for example, the case 11 and the net supporting member 14 may be formed integrally with each other. In this case, for example, the sidewall of the case may have an opening for housing the heat generating part 12, and the heat generating part 12 may be housed in the case 11 through the opening. Alternatively, a void may be provided between the heat generating part 12 housed in a bottom portion of the case 11 and the net supporting member 14.

Although the net supporting member 14 has a configuration in which the thin plates are arranged to have the lattice shape, or the net supporting member 14 has a configuration in which the column portions made of resin are arranged to have a lattice shape according to the above-described embodiments, the configuration is not limited to that examples.

According to the above-described third embodiment, the column portions 14a arranged to have the lattice shape are fastened to the case 11 by screwing. However, the column portions 14a arranged to have the lattice shape may have clocking clicks respectively, and the column portions 14a arranged to have the lattice shape are fastened to the case 11 using the locking clicks.

What is claimed is:

1. A radiant heater device that radiates a radiation heat when a current is applied to a heat generating part having a flat shape, the radiant heater device comprising:
    a cover arranged in a direction in which the radiation heat is radiated, the cover covers the heat generating part; and
    a supporting member supports the cover, wherein
    the cover is made of a material having a greater infrared transmissivity relative to the supporting member,
    the supporting member is arranged between the heat generating part and the cover, and
    a void is provided between the supporting member and the heat generating part.

2. A radiant heater device that radiates a radiation heat when a current is applied to a heat generating part having a flat shape, the radiant heater device comprising:
    a cover arranged in a direction in which the radiation heat is radiated, the cover covers the heat generating part; and
    a supporting member supports the cover, wherein
    the cover is made of a material having a greater infrared transmissivity relative to the supporting member,
    the heat generating part has an absence portion that lacks a heat generation function, and
    the supporting member is arranged between the absence portion and the cover.

3. A radiant heater device that radiates a radiation heat when a current is applied to a heat generating part having a flat shape, the radiant heater device comprising:
    a cover arranged in a direction in which the radiation heat is radiated, the cover covers the heat generating part;
    a supporting member supports the cover; and
    a case houses the heat generating part, wherein
    the cover is made of a material having a greater infrared transmissivity relative to the supporting member,
    the heat generating part has a hole to avoid being in contact with the supporting member, and
    the supporting member is arranged between the cover and the case to pass through an inside of the hole.

4. A radiant heater device that radiates a radiation heat when a current is applied to a heat generating part having a flat shape, the radiant heater device comprising:
    a cover arranged in a direction in which the radiation heat is radiated, the cover covers the heat generating part; and
    a supporting member supports the cover, wherein
    the cover is made of a material having a greater infrared transmissivity relative to the supporting member,
    the supporting member is arranged between the heat generating part and the cover,
    the heat generating part has an absence portion that lacks a heat generation function, and
    the absence portion is located on an opposite side of the cover with respect to the supporting member.

5. The radiant heater device according to claim 1, wherein a dimension of the void is a length that prevents the supporting member and the heat generating part from being in contact with each other.

6. The radiant heater device according to claim 2, wherein a width of the absence portion is greater than a width of the supporting member.

7. The radiant heater device according to claim 4, wherein a width of the absence portion is greater than a width of the supporting member.

* * * * *